United States Patent
Miyake et al.

(10) Patent No.: US 8,917,477 B1
(45) Date of Patent: Dec. 23, 2014

(54) DISK DEVICE

(71) Applicant: Kabushiki Kaisha Toshiba, Tokyo (JP)

(72) Inventors: Koji Miyake, Sagamihara (JP);
Takahiro Imamura, Fujisawa (JP);
Shinichi Kobatake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/256,855

(22) Filed: Apr. 18, 2014

Related U.S. Application Data

(60) Provisional application No. 61/856,949, filed on Jul. 22, 2013.

(51) Int. Cl.
*G11B 33/14* (2006.01)

(52) U.S. Cl.
CPC .......... *G11B 33/146* (2013.01); *G11B 33/1486* (2013.01)
USPC ....................................................... 360/97.18

(58) Field of Classification Search
USPC .......... 360/97.18, 97.14, 97.15, 97.12, 97.17, 360/97.22, 97.11
See application file for complete search history.

(56) References Cited

U.S. PATENT DOCUMENTS

| | | | |
|---|---|---|---|
| 7,218,473 B2 | 5/2007 | Bernett et al. | |
| 7,986,490 B2 | 7/2011 | Hirono et al. | |
| 2009/0120298 A1* | 5/2009 | Cheng | 96/421 |

FOREIGN PATENT DOCUMENTS

| | | |
|---|---|---|
| JP | H06-079437 B2 | 10/1994 |
| JP | 2001-028180 A | 1/2001 |

* cited by examiner

*Primary Examiner* — Allen T Cao
(74) *Attorney, Agent, or Firm* — Knobbe Martens Olson & Bear LLP

(57) ABSTRACT

According to one embodiment, a disk device includes a disk recording medium, a drive motor configured to support and rotate a recording medium, a suspension assembly which supports a head, a housing containing the recording medium, the drive motor and the suspension assembly, a filter in the housing, opposite to part of an outer peripheral edge of the recording medium, and through which an airflow generated by rotation of the recording medium flows, an exhaust hole formed at the housing and located opposite to an upstream side of the filter with respect to the airflow, and an air-intake formed at the housing and located opposite to a region of the housing, whose pressure is lower than the pressure of the upstream side of the filter.

8 Claims, 5 Drawing Sheets

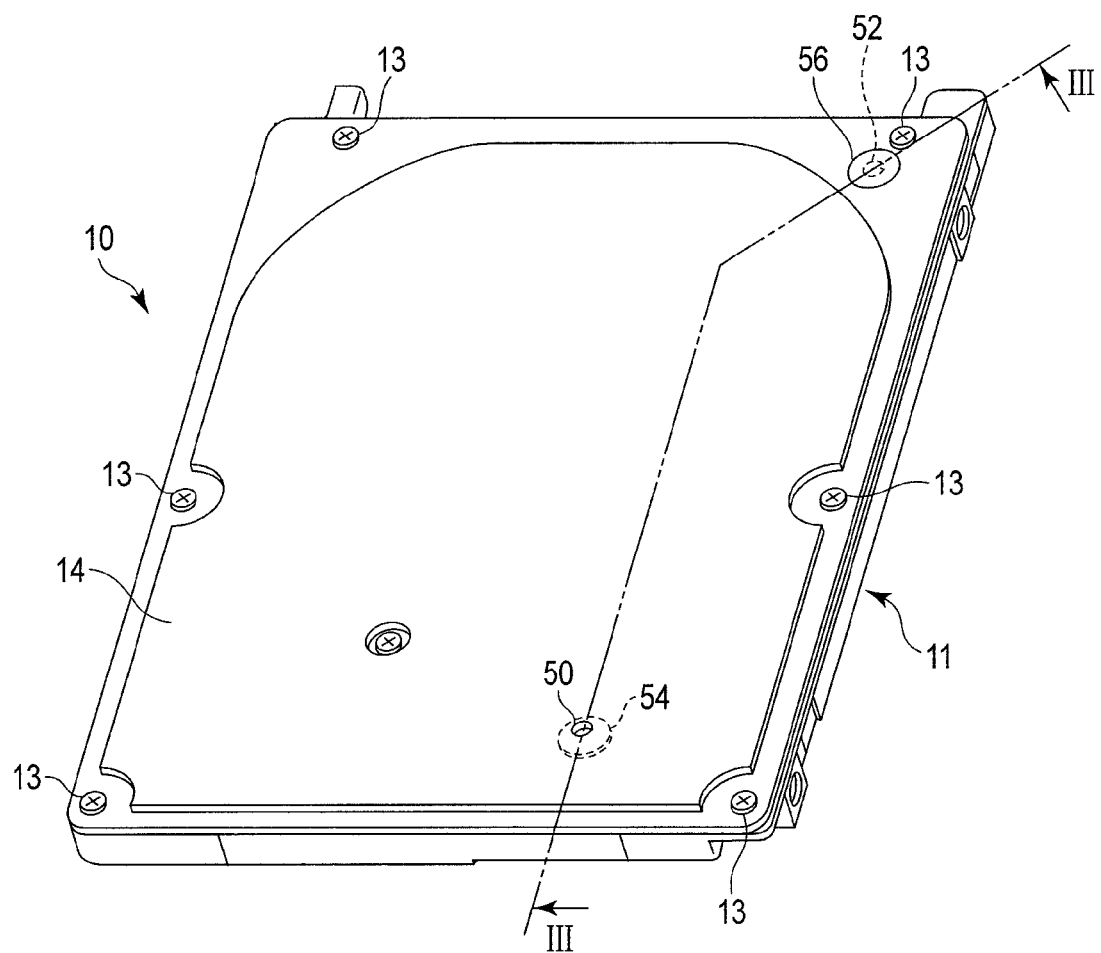
F I G. 1

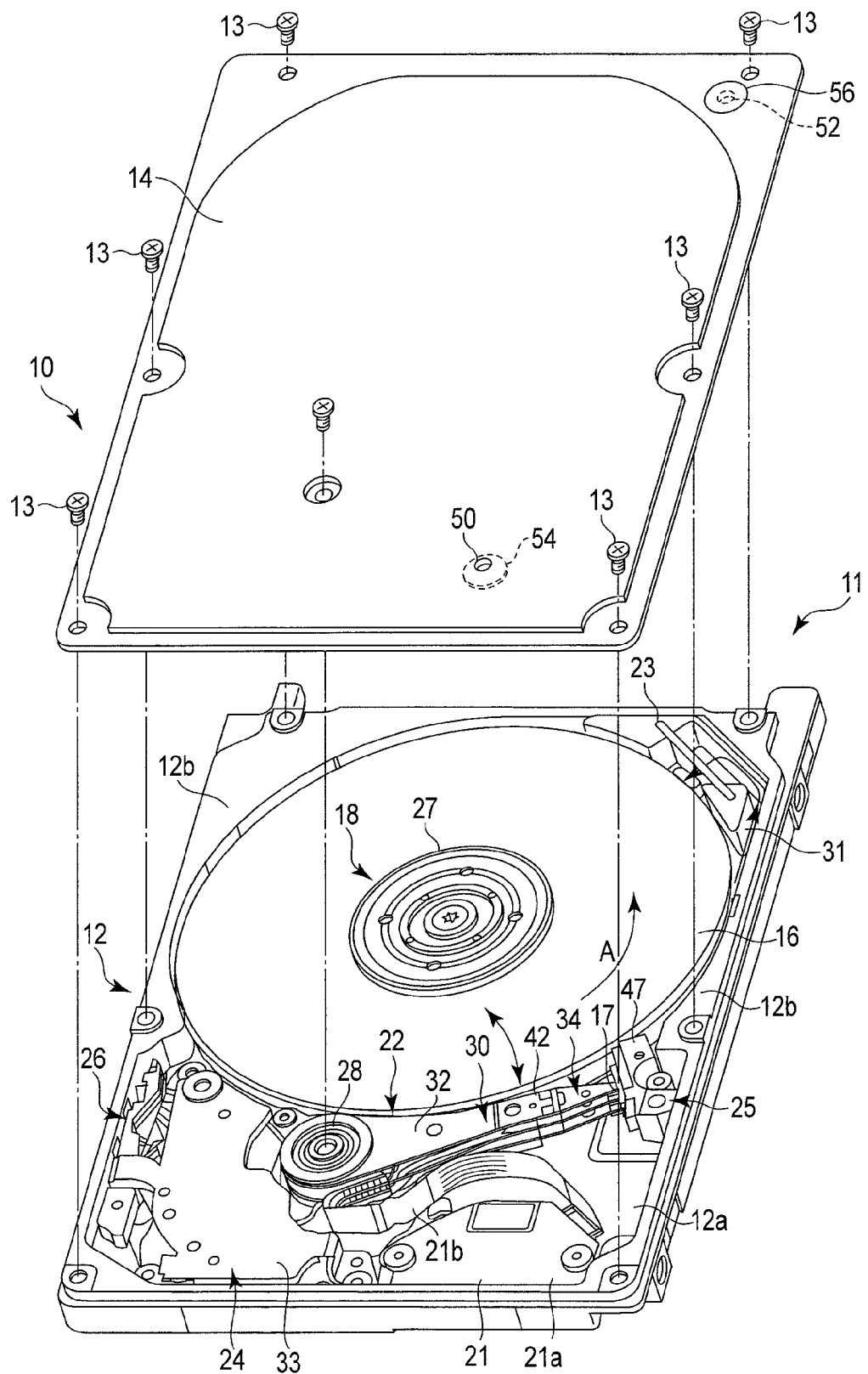
F I G. 2

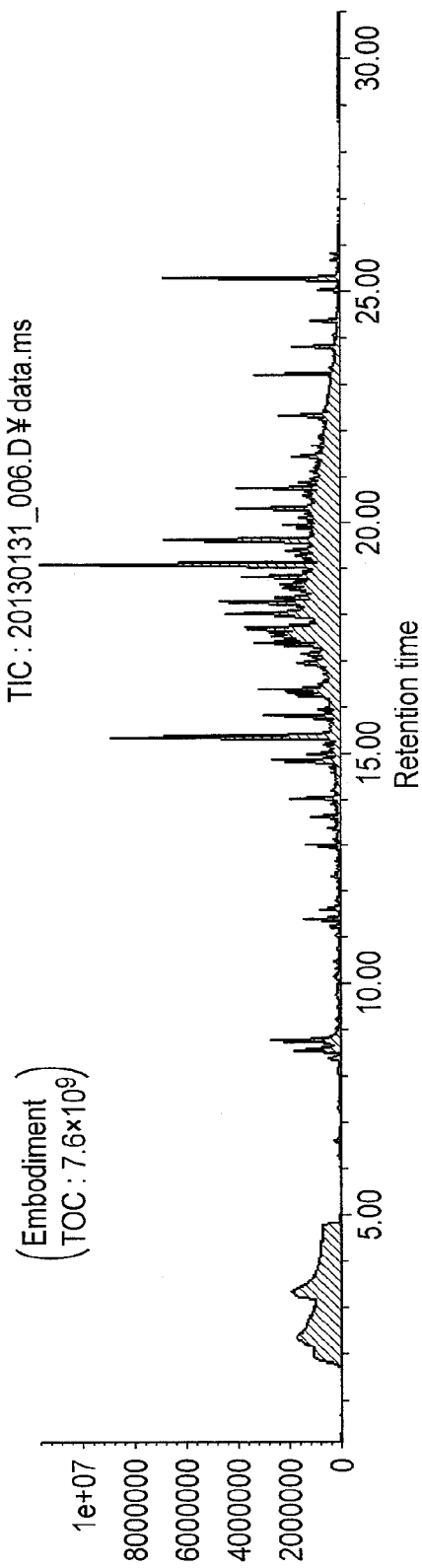
F I G. 5A
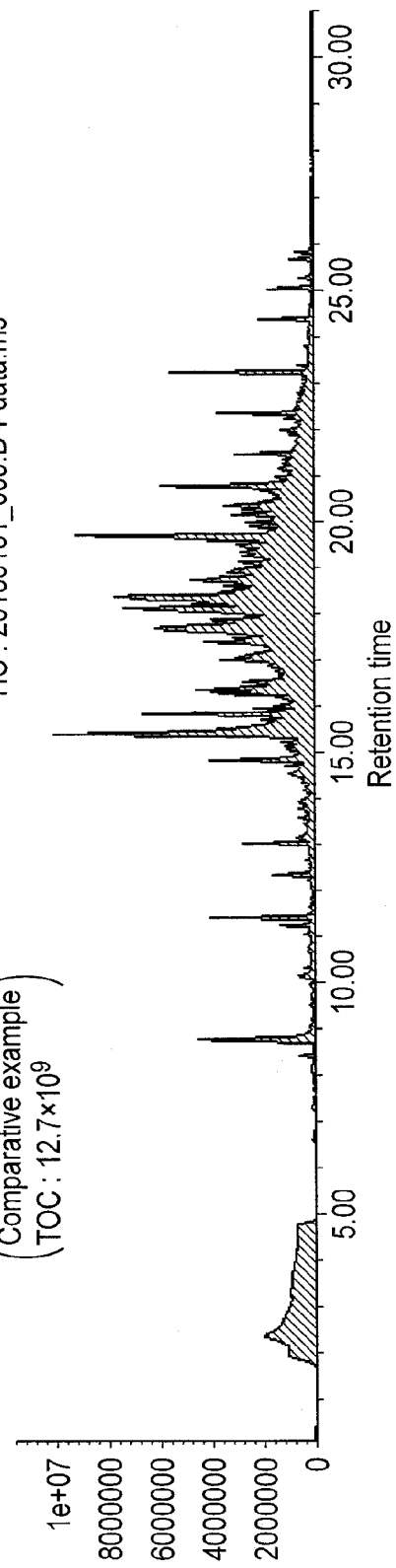
F I G. 5B

DISK DEVICE

CROSS-REFERENCE TO RELATED APPLICATIONS

This application claims the benefit of U.S. Provisional Application No. 61/856,949, filed Jul. 22, 2013, the entire contents of which are incorporated herein by reference.

FIELD

Embodiments described herein relate generally to a disk device.

BACKGROUND

In recent years, disk devices such as magnetic disk drives and optical disk drives have been widely used as image recording devices or external recording devices of computers.

As such the disk device, for example, a magnetic disk drive generally comprises a magnetic disk, a spindle motor which supports and rotates the magnetic disk, a head stack assembly supporting magnetic heads, a circuit board unit, etc, which are provided in a housing. The head stack assembly comprises a bearing portion and a plurality of head gimbal assemblies extending from the bearing portion. The head gimbal assemblies each comprise a suspension supporting the magnetic head and a wiring trace electrically connecting the magnetic head to the circuit board unit.

The circuit board unit comprises a base portion on which a connector, etc. are mounted, and a main flexible printed circuit board (hereinafter main FPC) extending from the base portion to the vicinity of the bearing portion. The main FPC includes an extended end portion having a plurality of connection portions, at which a plurality of connection pads are provided, respectively. The connection portions are attached to the bearing portion of a head actuator.

A manufacturing process of such the magnetic disk drive as stated above includes steps of heating the entire magnetic disk drive, and adjusting the operation of the disk drive and inspecting the disk drive in thermal resistance, at various temperatures. In this case, there is a possibility that gas will generate from components in the housing, such as a bearing, rubber and a flexible printed circuit board, and contaminate the inside of the housing. Also, even if the magnetic disk drive is assembled in a clean room, it can be considered that generated gas collects in the housing, and adversely affects the recording medium or the magnetic heads. Consequently, the reliability of the disk device is lowered.

BRIEF DESCRIPTION OF THE DRAWINGS

FIG. 1 is a perspective view showing an appearance of a hard disk drive (HDD) according to a first embodiment;

FIG. 2 is a perspective exploded view of an internal structure of the HDD;

FIGS. 5A and 5B are views showing comparison between results obtained by measuring gas generated in the HDD of the first embodiment and in an HDD of a comparative example after these HDDs are driven at a predetermined temperature for a predetermined time period.

DETAILED DESCRIPTION

Various embodiments will be described hereinafter with reference to the accompanying drawings. In general, according to one embodiment, a disk device comprises: a disk recording medium; a drive motor configured to support and rotate the recording medium; a suspension assembly configured to support a head to be movable relative to the recording medium; a housing containing the recording medium, the drive motor and the suspension assembly; a filter in the housing and opposite to part of an outer peripheral edge of the recording medium, and through which an airflow generated by rotation of the recording medium flows; an exhaust hole formed at the housing and located opposite to an upstream side of the filter with respect to the airflow; and an air-intake formed at the housing and located opposite to a region of the housing, whose pressure is lower than a pressure of the upstream side of the filter.

Hard disk drives (HDDs) according to embodiments provided as magnetic disk devices will be described in detail.

First Embodiment

Figure 3:
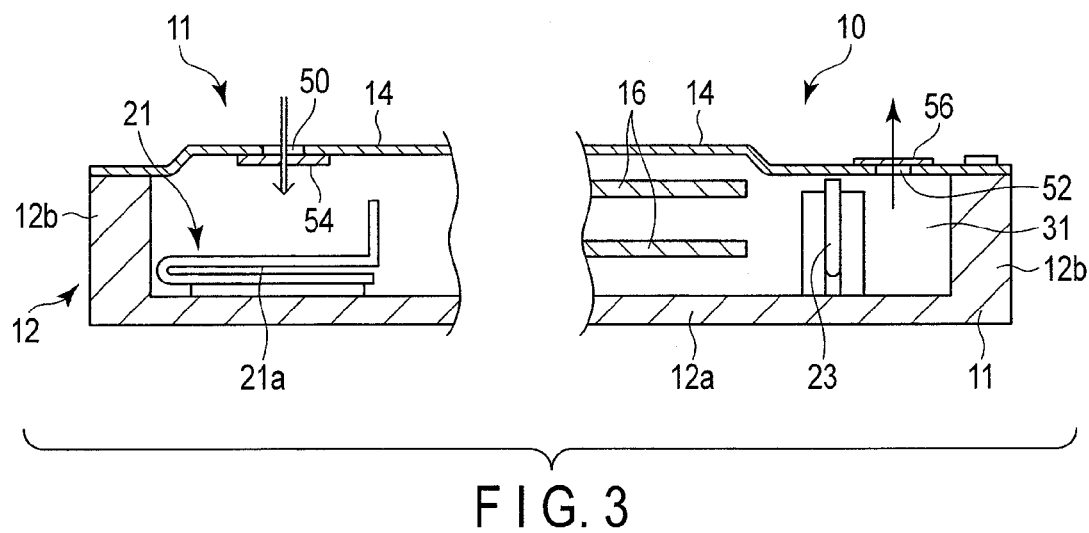
FIG. 3 is a cross-sectional view of the HDD which is taken along line in FIG. 1.

FIG. 1 is a perspective view of an appearance of an HDD according to a first embodiment. FIG. 2 is a perspective exploded view of an internal structure of the HDD. FIG. 3 is a cross-sectional view of the HDD which is taken along line in FIG. 1.

As shown in FIGS. 1 and 2, an HDD 10 comprises a housing 11 which is substantially rectangular and has flat surfaces. The housing 11 comprises an open-topped rectangular box-shaped base 12, and a top cover 14 screwed to the base 12 by a plurality of screws 13 to close the upper end opening of the base 12. The base 12 comprises a rectangular bottom wall 12a opposed to the top over 14 with a gap therebetween, and a side wall 12b standing along an outer peripheral edge of the bottom wall 12a. The top cover 14 has an outer peripheral edge which is fixed to an upper face of the side wall 12b by, e.g., packing not shown.

In the housing 11, two magnetic disks 16 are provided as recording mediums, and a spindle motor 18 is provided as a drive portion which supports and rotates the magnetic disks 16. The spindle motor 18 is provided on the bottom wall 12a. Each of the magnetic disks 16 has a diameter of, e.g., 65 mm (2.5 inches) and comprises magnetic recording layers at upper and lower surfaces of each magnetic disk 16. The magnetic disks 16 are coaxially fitted on a hub not shown of the spindle motor 18, and also clamped by a clamp spring 27 and thus fixed to the hub. The magnetic disks 16 are supported in parallel with the bottom wall 12a of the base 12. The magnetic disks 16 are rotated by the spindle motor 18 at a predetermined speed in a direction indicated by an arrow A.

In the housing 11, a plurality of magnetic heads 17 and a head stack assembly 22 are provided. The magnetic heads 17 are configured to record and reproduce data on and from the magnetic disks 16. The head stack assembly 22 supports the magnetic heads 17 to be movable relative to the magnetic disks 16. Furthermore, in the housing 11 are provided a voice coil motor (hereinafter VCM) 24, a ramp loading mechanism 25, a latch mechanism 25 and a board unit 21. The VCM 24 rotates and positions the head stack assembly 22. The ramp loading mechanism 25 holds the magnetic heads 17 in unloaded positions off the magnetic disks 16 when the magnetic heads 17 are moved to outermost peripheries of the magnetic disks 16. The latch mechanism 26 holds the head stack assembly 22 in a retreat position when an impact or the like acts on the HDD. Electronic components such as a conversion connector are mounted in the board unit 21. It should be noted that the latch mechanism 26 is not limited to a mechanical latch; i.e., a magnetic latch may be used as the latch mechanism 26.

A printed circuit board not shown is screwed to an outer surface of the bottom wall 12a of the base 12. The printed circuit board controls operations of the spindle motor 18, the VCM 24 and the magnetic heads 17, through the board unit 21.

A circulation filter 23 is provided In the vicinity of the side wall 12b of the base 12. The circulation filter is configured to catch dust generated in the housing due to an operation of a moving part and is located outside of the magnetic disks 16. To be more specific, the circulation filter 23 is provided at, e.g., a corner portion of the housing 11 which is located farthest from a bearing unit 28 of the head stack assembly 22, and is also located close to outer peripheral edges of the magnetic disks 16. The circulation filter 23 is formed substantially rectangular, and supported upright in a direction substantially perpendicular to the bottom wall 12a of the base 12. The circulation filter 23 is opposite to a space between the magnetic disks 16, and faces toward the centers of the magnetic disks 16.

In the housing 11 is defined an airflow pass 31 which guides an airflow generated due to rotation of the magnetic disks 16, along the side wall 12b of the base 12 and a corner portion of the base 12 and introduces to the circulation filter 23.

As shown in FIG. 2, the head stack assembly 22 comprises four head suspension assemblies 30 which are attached to the bearing unit 28 such that they are stacked together, and spacer rings not shown which are provided between the four head suspension assemblies 30. The bearing unit 28 comprises a shaft provided to stand at the bottom wall 12a of the base 12 in the vicinity of the outer peripheries of the magnetic disks 16, and a cylindrical sleeve rotatably supported by the shaft, with a bearing interposed between the sleeve and the shaft.

The head suspension assemblies 30 comprise arms 32 extending from the bearing unit 28, suspensions 34 extending from the arms 32 and the magnetic heads 17 supported at extended ends of the suspensions 34. It should be noted that in the first embodiment, the head suspension assembly 30 includes the arm 32; however, it may include no arm.

The four head suspension assemblies 30 are arranged so that the two magnetic heads 17 are located opposite to each other, with the magnetic disk 16 interposed between the magnetic heads 17. Therefore, when the head stack assembly 22 is rotated about the bearing unit 28, the magnetic heads 17 can be moved to arbitrary tracks of the magnetic disks 16.

The VCM 24 comprises a support frame not shown which extends from the bearing unit 28 in a direction away from the arms 32 and a voice coil supported by the support frame. The voice coil is located between a pair of yokes 33 fixed on the base 12. The voice coil, the yokes 33 and magnets fixed to the yokes 33 constitute the VCM 24. As shown in FIG. 2, the board unit 21 comprises a main body 21a made of a flexible printed circuit board (FPC). The main body 21a is fixed to the bottom wall 12a of the base 12. Electronic components not shown such as a conversion connector are mounted on the main body 21a. On a bottom surface of the main body 21a is provided a connector not shown for use in connecting the main body 21a to the printed circuit board.

The board unit 21 comprises a main flexible printed circuit board (hereinafter a main FPC) 21b extending from the main body 21a. An extended end of the main FPC 21b constitutes a connecting end portion, and fixed in the vicinity of the bearing unit 28 of the head stack assembly 22. Each head suspension assembly 30 comprises a flexure not shown which is electrically connected to the magnetic head 17. Also, a proximal end portion of the flexure is mechanically and electrically connected to the connecting end portion of the main FPC 21b. Thereby, the board unit 21 is electrically connected to the magnetic heads 17 through the main FPC 21b and the flexures.

As shown in FIG. 2, the ramp loading mechanism 25 comprises a ramp 47 located on the bottom wall 12a of the base 12 and outward of the magnetic disks 16, and tabs not shown extending from distal ends of the suspensions 34. When the head stack assembly 22 is rotated about the bearing unit 28, and the magnetic heads 17 are moved to their retreat positions which are located outward of the magnetic disks 16, the tabs are moved on a ramped surface of the ramp 47, and then pulled up along the ramped surface. As a result, the magnetic heads 17 are unloaded from the magnetic disks 16, and held in the retreat positions.

As shown in FIGS. 1 to 3, the housing 11 of the HDD 10 comprises an air-intake 50 and an exhaust hole 52. The air-intake 50 is provided opposite to that region in the housing 11, whose pressure is relatively small. In the first embodiment, the air-intake 50 is formed in a region of the top cover 14 which is opposite to the main body 21a of the board unit 21. An air filter 54 is provided on an inner surface of the top cover 14 to close the air-intake 50. The air filter 54 catches dust from outside air flowing from the air-intake 50 into the housing 11. It should be noted that the air filter 54 may contain activated carbon to further catch organic contamination (chemical substance).

Figure 4:
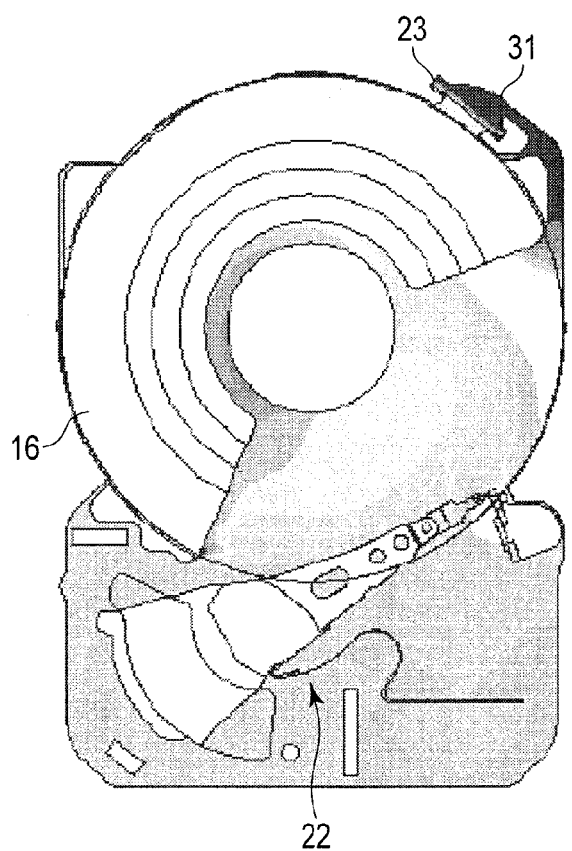
FIG. 4 is a view for schematically showing a pressure distribution of inside of the HDD.

The exhaust hole 52 is located opposite to a region of the inside of the housing 11, whose pressure is relative high. FIG. 4 is a view for schematically showing pressure distribution of the inside of the housing 11, which is obtained when the magnetic disks 16 are rotated. In FIG. 4, the deeper the color, the higher the pressure. It can be seen from FIG. 4 that the pressure is high in the vicinity of an upstream side of the circulation filter 23 with respect to airflow generated in the housing and in the position of the airflow pass 31.

When the absolute value (Pout) of the difference between atmospheric pressure and the pressure of the vicinity of the exhaust hole 52 is compared with the absolute value (Pin) of the difference between atmospheric pressure and the pressure of the vicinity of the air-intake 50, it can be found that the absolute value (Pout) is greater than the absolute value (Pin); that is, the relationship "(Pout)>(Pin)" is satisfied.

In view of the above, in the first embodiment, as shown in FIGS. 1 to 3, the exhaust hole 52 is provided in an area of the top cover 14 which is located close to the upstream side of the circulation filter 23 with respect to the air flow and opposite to the airflow pass 31. Also, the exhaust hole 52 is located in such a position as not to interfere with screwing of the top cover 14. An air filter 54 may be provided on the inner surface of the top cover 14 to close the exhaust hole 52 and thus prevent dust from entering the HDD due to backflow of air when the HDD is not driven. In the first embodiment, after heat treatment in a manufacturing process of the HDD, which will be described later, a discoid seal (sealing member) 56 is stuck on an outer surface of the top cover 14 to close the exhaust hole 52.

In the manufacturing process, for example, in a clean room, the entire HDD having the above structure is heated, with the magnetic disks driven, and at various temperatures, the operation of the disk device is adjusted, and the disk device is inspected in thermal resistance. To be more specific, when the HDD is heated to a high temperature, e.g., approximately 60° C., gas including organic contamination is generated from components in the housing 11, such as a bearing unit, rubber and FPC. In the HDD according to the first embodiment, in the manufacturing process, the seal 56 for the exhaust hole 52 is still not stuck; that is, the exhaust hole 52 is kept open. Thereby, air containing the gas is exhausted from the housing 11 through the exhaust hole 52 provided in a region whose pressure is high and which is located upstream side of the airflow passing through the circulation filter 23, and outside air having a high level of cleanliness is supplied into the housing through another hole, i.e., the air-intake 50 in the first embodiment. Therefore, the amount of gas remaining in the housing 11 is greatly reduced, and the level of cleanliness of air in the housing 11 in the manufacturing process is improved. The above feature can prevent the magnetic disks or the magnetic heads from being contaminated by organic contamination.

FIGS. 5A and 5B show results obtained by measuring, after heat treatment of the HDD, the remaining amounts of organic contamination in the housing of the HDD according to the first embodiment and that of an HDD of a comparative example (which does not have the exhaust hole 52). In this measurement, the HDDs are driven at about 50° C. for 26 hours, with a catching member for catching organic contamination or chemical substance provided in the HDDs, and organic contamination or chemical substance contained in gas generated in the housing is caught by the catching member. Then, the organic contamination or chemical substance captured by the caching member is measured by the Gas Chromatograph Mass Spectrometer (GCMS, analyzing device). As shown in FIG. 5A, in the HDD according to the first embodiment, the measured amount of a total organic compound (TOC) is approximately $7.6 \times 10^9$. On the other hand, in the HDD of the comparative example, the amount of TOC is approximately $1.2 \times 10^9$. From this, it can be seen that in the HDD of the first embodiment, the amount of residual gas (TOC) is smaller than that in the HDD of the comparative example by approximately 40% (a ratio between areas defined by transverse axes and characteristic lines in FIGS. 5A and 5B).

After completion of the above adjustment of the HDD at high temperature, the seal 56 is stuck on the top cover 14 to close the exhaust hole 52. By virtue of the seal 56 closing the exhaust hole 52, organic contamination, dust or the like is prevented from entering the HDD when the HDD is operated.

In the first embodiment, the exhaust hole 52 is formed in the top cover 14, however, it may be provided in the base 12. Thus, disk devices can be more efficiently manufactured, and the exhaust hole 52 can be more easily closed after the manufacturing process. Also, the air-intake 50 is provided in a region whose pressure is not greatly varied, e.g., in the vicinity of the yoke 33 and the main FPC 21b or part of the base 12 which is located below the magnetic disks 16. The difference in pressure between the exhaust hole and the air intake is great, and air can be efficiently exhausted from the housing.

Furthermore, an air filter for removing dust and/or chemical substance is provided at the air-intake 50 and/or the exhaust hole 52 in order to prevent particles from entering the HDD and improve the level of cleanliness in air taken in the HDD.

By virtue of the above structure, the first embodiment can provide an HDD which improves the level of cleanliness of air in the housing and also its reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 6:
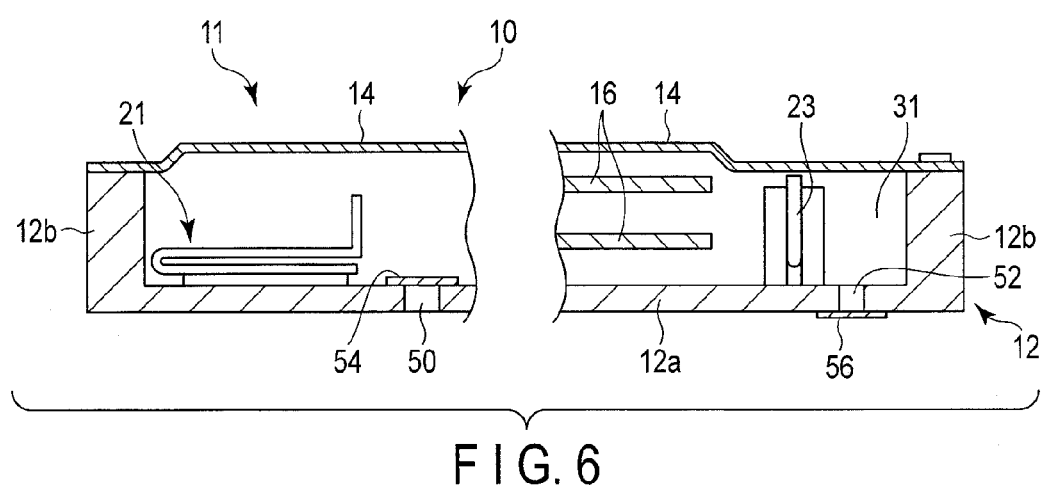
FIG. 6 is a cross-sectional view of a main portion of an HDD according to another embodiment.

For example, as shown in FIG. 6, the exhaust hole of the housing 11 need not be provided in the top cover 14, i.e., it may be provided in the base 12. In this case also, the exhaust hole 52 is provided in a region whose pressure is high in the housing, for example, in a region continuous with the vicinity of the upstream side with respect to the circulation filter 23. Furthermore, the air-intake 50 need not be provided in the top cover 14; i.e., it may be provided in the base 12.

The sizes of the magnetic disks are not limited to 2.5 inches; i.e., they may be set to another size. The number of magnetic disks is not limited to two, i.e., it may be one or three. Also, the number of head suspension assemblies may be increased or decreased in accordance with the number of magnetic disks.

What is claimed is:

1. A disk device comprising:
    a disk recording medium;
    a drive motor configured to support and rotate the recording medium;
    a suspension assembly configured to support a head to be movable relative to the recording medium;
    a housing containing the recording medium, the drive motor and the suspension assembly;
    a filter in the housing and opposite to part of an outer peripheral edge of the recording medium, and through which an airflow generated by rotation of the recording medium flows;
    an exhaust hole formed at the housing and located opposite to an upstream side of the filter with respect to the airflow; and
    an air-intake formed at the housing and located opposite to a region of the housing, whose pressure is lower than a pressure of the upstream side of the filter.

2. The disk device of claim 1, wherein an absolute value (Pout) of a difference between atmospheric pressure and a pressure of a vicinity of the exhaust hole and an absolute value (Pin) of a difference between the atmospheric pressure and a pressure of a vicinity of the air-intake satisfy the following relationship:

(Pout)>(Pin).

3. The disk device of claim 1, wherein the housing comprises a base including an upper opening, and a top cover fixed to the base and closing the upper opening of the base; and
    at least one of the exhaust hole and the air-intake is formed at the top cover.

4. The disk device of claim 3, wherein the top cover comprises a plurality of fixing portions screwed to the base; and
    the exhaust hole is formed in the top cover and located at a position displaced from the fixing portions and opposite to the upstream side of the filter.

5. The disk device of claim 1, wherein the housing comprises a base including an upper opening, and a top cover fixed to the base and closing the upper opening of the base; and
    at least one of the exhaust hole and the air-intake is provided at the base.

6. The disk device of claim 1, which further comprises:
   a voice coil motor in the housing, configured to drive the head suspension assembly; and
   a board unit in the housing and at which wiring to be connected to the head is provided,
   wherein the air-intake is located close to one of the voice coil motor and the board unit in the housing.

7. The disk device of claim 1, which further comprises an air filter configured to catch at least one of dust and chemical substance and close at least one of the exhaust hole and the air-intake.

8. The disk device of claim 1, which further comprises a seal stuck on the housing to close the exhaust hole.

\* \* \* \* \*